United States Patent
Kajikawa et al.

(10) Patent No.: US 9,476,790 B2
(45) Date of Patent: Oct. 25, 2016

(54) PRESSURE GAUGE CALIBRATION APPARATUS

(75) Inventors: Hiroaki Kajikawa, Tsukuba (JP); Tokihiko Kobata, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 287 days.

(21) Appl. No.: 14/345,738

(22) PCT Filed: Sep. 13, 2012

(86) PCT No.: PCT/JP2012/073457
§ 371 (c)(1),
(2), (4) Date: Mar. 19, 2014

(87) PCT Pub. No.: WO2013/042607
PCT Pub. Date: Mar. 28, 2013

(65) Prior Publication Data
US 2014/0223988 A1    Aug. 14, 2014

(30) Foreign Application Priority Data
Sep. 20, 2011 (JP) .................................. 2011-204434

(51) Int. Cl.
*G01L 27/00* (2006.01)
(52) U.S. Cl.
CPC .................................. *G01L 27/005* (2013.01)
(58) Field of Classification Search
CPC . G01L 27/005; G01L 27/002; G01L 27/007; G01L 27/02
See application file for complete search history.

(56) References Cited

U.S. PATENT DOCUMENTS 3,777,546 A  *  12/1973  Rollins  .................  G01L 27/005
                                                    73/1.57
5,808,176 A  *   9/1998  Chang  ...................  G01L 27/005
                                                    73/1.58
(Continued)

FOREIGN PATENT DOCUMENTS

GB        2391067 A    *   1/2004
JP       4-250328 A        9/1992
(Continued)

OTHER PUBLICATIONS

International Search Report, mailed Nov. 20, 2012, issued in PCT/JP2012/073457.
(Continued)

*Primary Examiner* — David A Rogers
(74) *Attorney, Agent, or Firm* — Birch, Stewart, Kolasch & Birch, LLP (57) ABSTRACT

This is an easy-to-use pressure gauge calibration apparatus, which uses a pressure gauge as a standard device and is not affected by an order of calibration pressure points or pressure holding time. The pressure gauge calibration apparatus includes a pressure gauge serving as a standard device, the pressure gauge being calibrated in advance by a calibration procedure to repeat necessarily restoring a predetermined pressure state after data acquisition at each calibration pressure point, and adjusting pressure to a subsequent calibration pressure point, a pressure generation control device, a shut-off valve, and a measurement control unit.

6 Claims, 10 Drawing Sheets

(56) References Cited

U.S. PATENT DOCUMENTS

| | | | |
|---|---|---|---|
| 6,848,292 B2* | 2/2005 | Joseph | G01L 27/005 73/1.57 |
| 7,086,272 B2* | 8/2006 | Wu | G01L 17/00 73/1.59 |
| 2005/0116729 A1* | 6/2005 | Koester | G01L 27/005 324/750.03 |
| 2005/0120773 A1* | 6/2005 | Ohl | G01L 27/007 73/1.71 |
| 2015/0226628 A1* | 8/2015 | Stering | G01L 27/005 73/1.63 |
| 2015/0323409 A1* | 11/2015 | Jiang | F04B 35/04 73/1.63 |

FOREIGN PATENT DOCUMENTS

| | | | |
|---|---|---|---|
| JP | 2000-65668 A | | 3/2000 |
| JP | 2003-57141 A | | 2/2003 |
| SU | 1326926 A | * | 7/1987 |
| SU | 1527533 A1 | * | 12/1989 |
| WO | WO 2007/145106 A1 | | 12/2007 |

OTHER PUBLICATIONS

Kajikawa et al., "Effects of pressurization procedures on calibration results for precise pressure transducers", Measurement Science and Technology, vol. 21, No. 6, pp. 1-8, 2010.

* cited by examiner

(b) < PRESSURIZING PROCEDURE IN RELATED ART >

PRESSURE GAUGE CALIBRATION APPARATUS

TECHNICAL FIELD

The present invention relates to a pressure gauge calibration apparatus, and particularly to a calibration apparatus which is suitable for testing and managing a pressure gauge used in industrial fields.

BACKGROUND ART

A pressure gauge calibration apparatus in the related art has been known which uses a dead weight pressure balance as a standard device. The apparatus compares a pressure applied to a calibrated device by the dead weight pressure balance with an indicated value of the calibrated device (see FIG. 1). The dead weight pressure balance is excellent in long-term stability and a generated pressure thereof is hardly affected by a calibration procedure. Accordingly, it is possible to calibrate a pressure gauge in any desired calibration procedure. It is also possible to evaluate, for example, a hysteresis characteristic and a time-dependent change characteristic of the pressure gauge that is the calibrated device.

Figure 2:
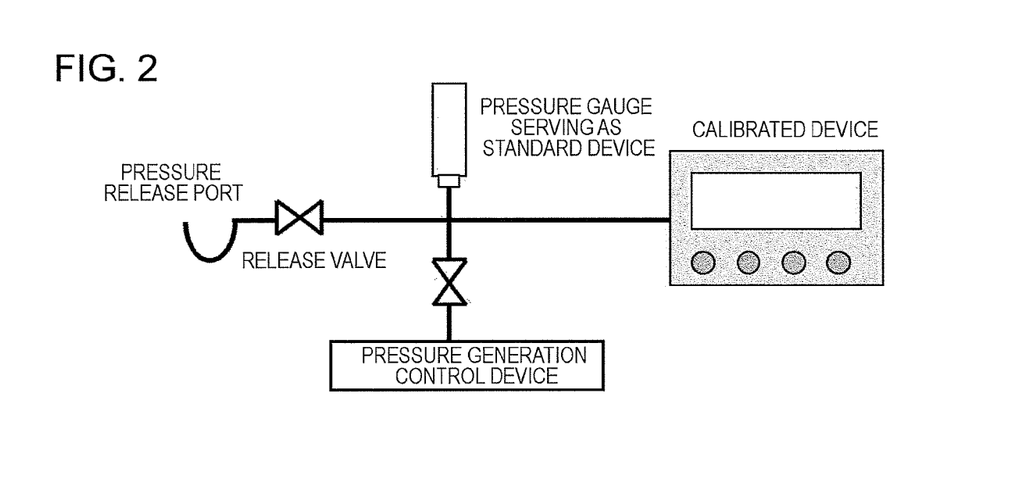
FIG. 2 is a pressure gauge calibration apparatus that uses a pressure gauge in the related art as a standard device.

Calibration using a calibrated pressure gauge as the standard device without using the dead weight pressure balance also has been known in the related art (see FIG. 2). The same pressure is always applied to the pressure gauge that serves as the standard device and the calibrated device during the calibration. The calibrated device is calibrated by comparing two outputs at each calibration pressure point. This method relatively facilitates automation, thereby enabling an efficient calibration.

Figure 3:
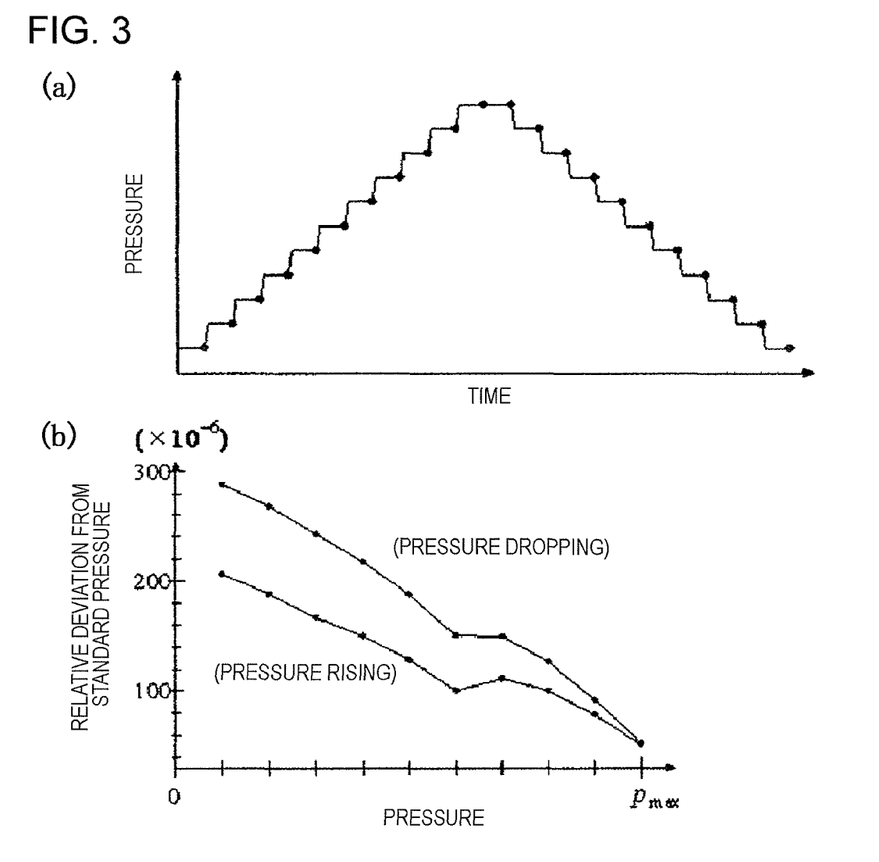
FIG. 3 illustrates a step-wise calibration procedure in the related art and calibration results thereof.

The pressure gauge serving as the standard device is calibrated by a superior standard device in advance. A calibration value thereof is however affected by the calibration procedure. FIG. 3 illustrates that in a case of a general step-wise calibration procedure, the calibration values are different from each other during a pressure rising process and a pressure dropping process due to a history effect. FIG. 3(a) illustrates a time change in a pressure received by the pressure gauge in the general step-wise calibration procedure. At each calibration pressure point, measurement is performed when certain waiting time passes after pressure adjustment. The time for measurement is illustrated by a black circle in the drawing. FIG. 3(b) illustrates a calibration result obtained by the step-wise calibration procedure. A horizontal axis represents the pressure, and a measurement result on a vertical axis represents a relative deviation of an output in the pressure gauge from a standard value. A significant difference (referred to as a hysteresis difference) can be seen in the measurement results between the pressure rising process and the pressure dropping process.

Figure 4:
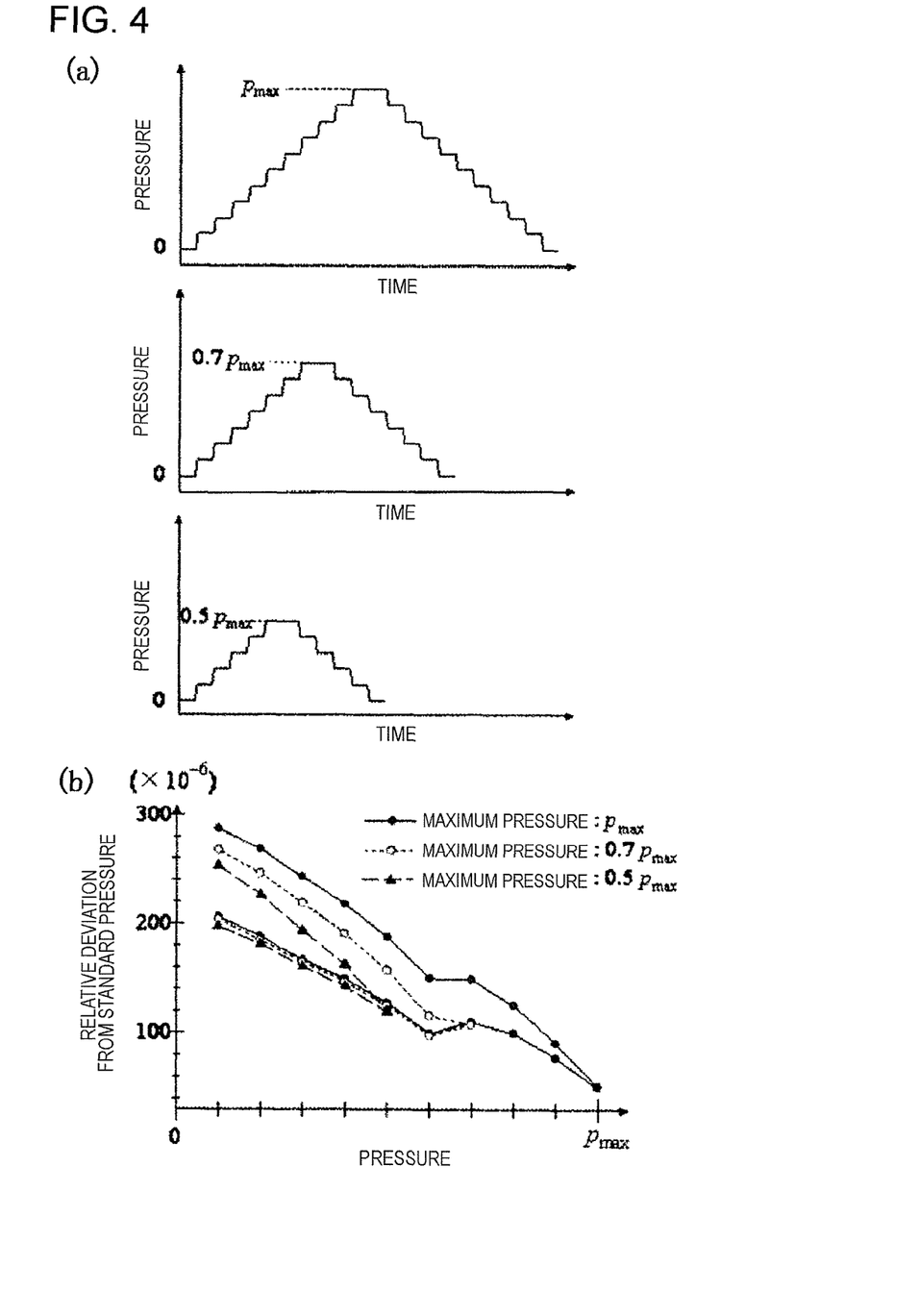
FIG. 4 illustrates influence when the maximum pressure of calibration is changed in a step-wise calibration procedure in the related art.

FIG. 4 illustrates that the result of the pressure dropping process is affected when the maximum pressure of the calibration in the step-wise calibration procedure is changed. FIG. 4(a) illustrates the time change in the pressure received by the pressure gauge. The maximum pressure is changed into three types without changing the time interval for the measurement. In FIG. 4(b), the results obtained with the three type calibration procedures are compared with one another. The horizontal axis represents the pressure, and the vertical axis represents the relative deviation of the output in the pressure gauge from the standard value. The measurement result during the pressure dropping process is greatly affected by the maximum pressure in the calibration. As the maximum pressure is lowered, the hysteresis difference is decreased.

Figure 5:
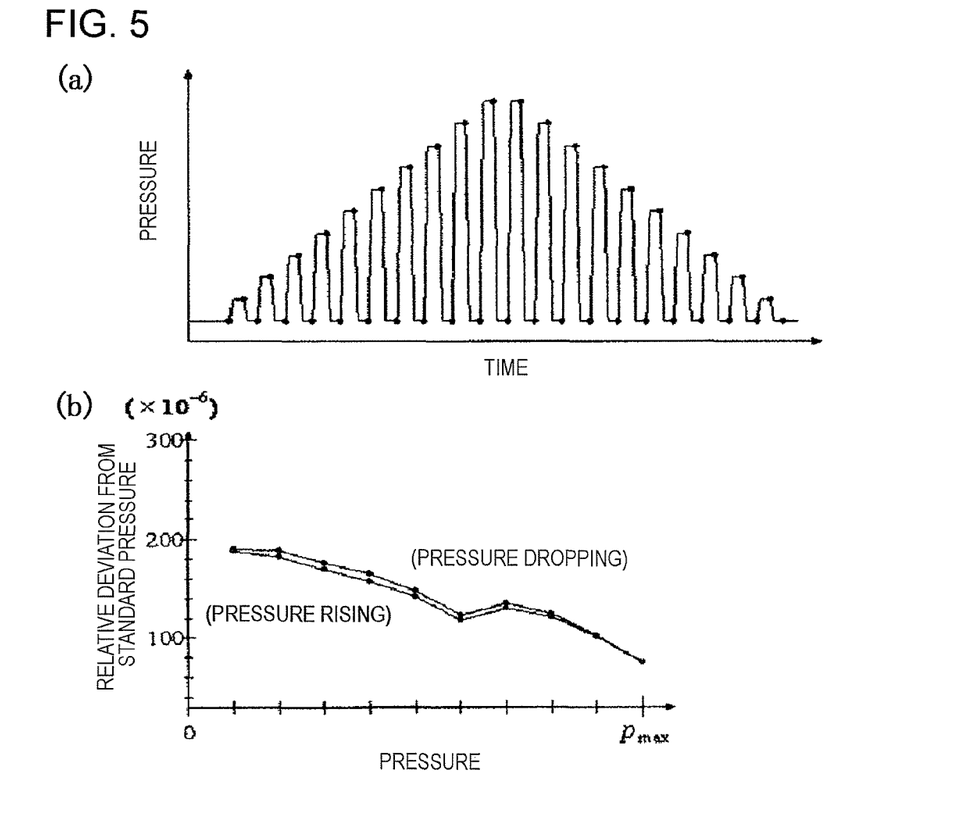
FIG. 5 illustrates a 0-A-0 type calibration procedure previously proposed by the present inventors in Non-Patent Document 1.
Figure 6:
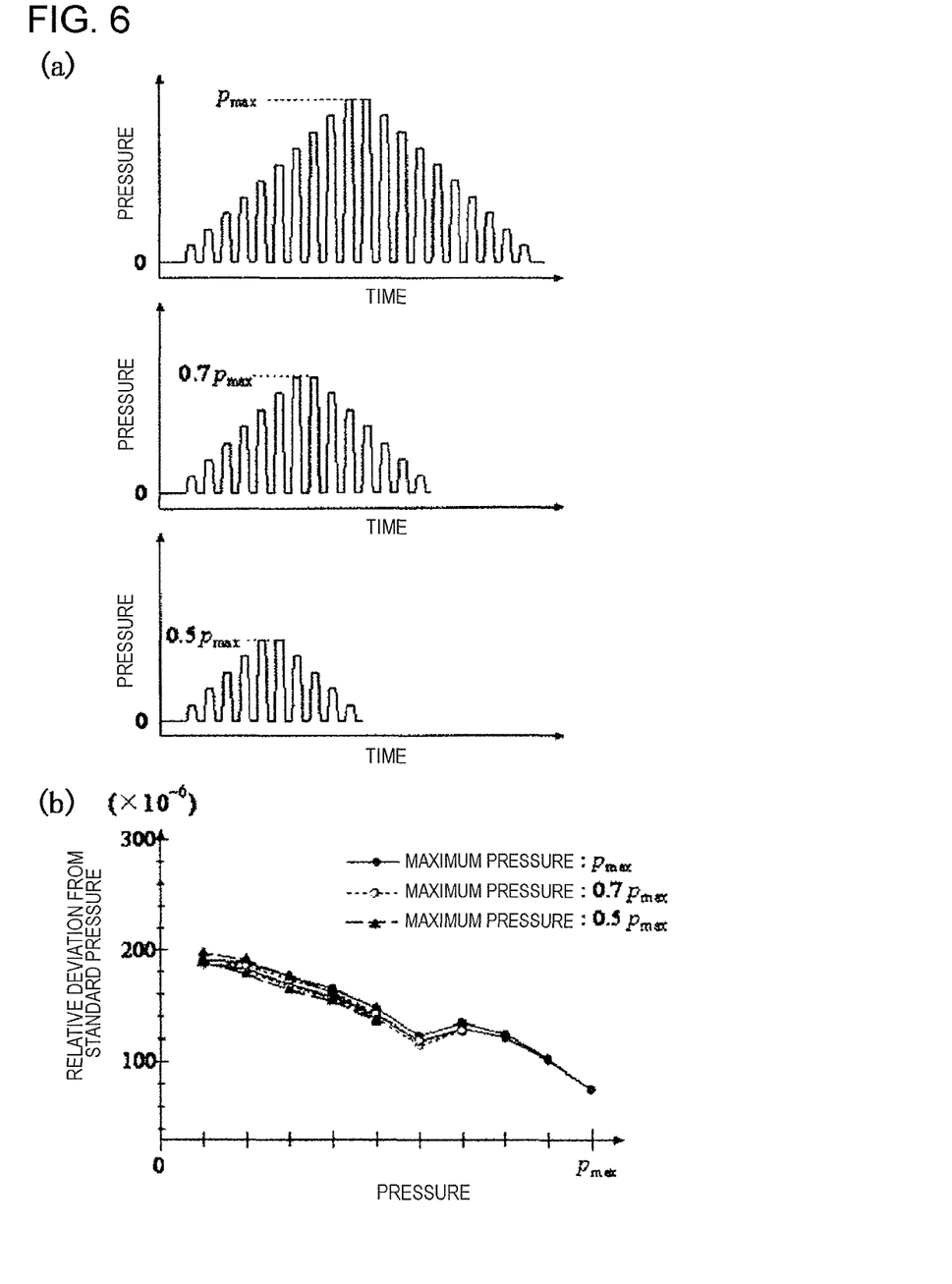
FIG. 6 illustrates influence when the maximum pressure is changed in the 0-A-0 type calibration procedure previously proposed by the present inventors in Non-Patent Document 1.

The present inventors have previously proposed the following finding in Non-Patent Document 1. In order to be less sensitive to the calibration procedure as described above, a pressure is necessarily restored to a pressure zero state (for example, in a case of a gauge pressure, an atmospheric pressure release state or a standard atmospheric pressure state may be acceptable) after data acquisition at each calibration pressure point as illustrated in FIG. 5. In this procedure (referred to as a 0-A-0 type calibration procedure), the hysteresis difference is decreased and the measurement result is less affected even when the maximum pressure in the calibration is changed as illustrated in FIG. 6.

FIG. 5(a) illustrates the time change in the pressure received by the pressure gauge in the 0-A-0 type calibration procedure. FIG. 5(b) illustrates the calibration result obtained during the 0-A-0 type calibration procedure. The horizontal axis represents the pressure, and the vertical axis represents the relative deviation of the output in the pressure gauge from the standard value. As compared to the step-wise calibration, the difference is much decreased between the pressure rising process and the pressure dropping process (see FIG. 3(b)). FIG. 6(a) illustrates the time change in the pressure applied to the pressure gauge. The maximum pressure is changed into three types without changing the time interval for the measurement. In FIG. 6(b), the results obtained during the three type calibration procedures are compared with one another. If the 0-A-0 type calibration procedure is adopted, the influence of the maximum pressure on the calibration result can be suppressed to be much smaller.

RELATED DOCUMENT

Non-Patent Document

[Non-Patent Document 1] Hiroaki Kajikawa and Tokihiko Kobata, "Effects of Pressurization Procedures on Calibration Results for Precise Pressure Transducers", Meas. Sci. Technol. Vol. 21, No. 6 (2010), pp. 065104

DISCLOSURE OF THE INVENTION

Problems to be Solved by the Invention

Figure 1:
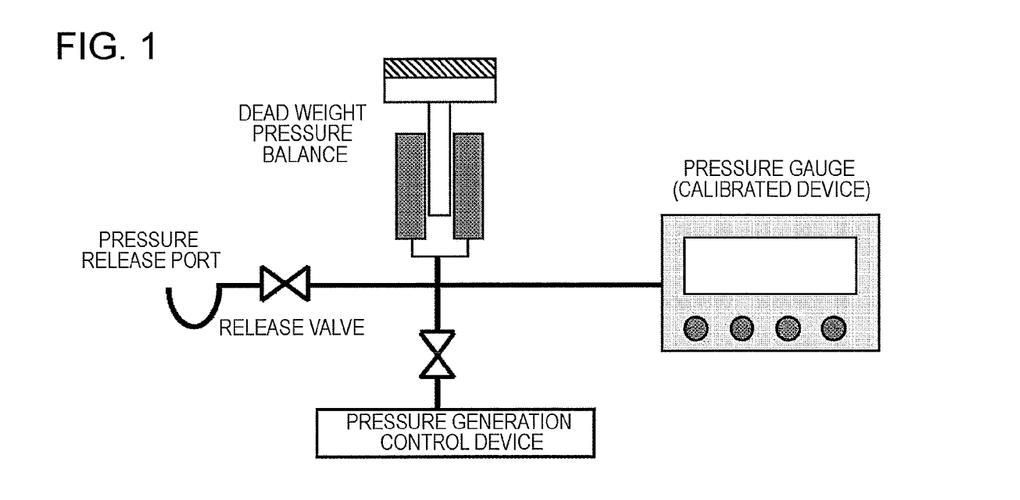
FIG. 1 is a pressure gauge calibration apparatus that uses a dead weight pressure balance in the related art as a standard device.

In the calibration using the dead weight pressure balance as illustrated in FIG. 1 as the standard device, an operation of the dead weight pressure balance is complicated, and thus a skilled technique is required. An apparatus has been introduced which automatically performs the operation of the dead weight pressure balance. The apparatus is however not only very expensive, but also troublesome in maintenance and management.

In the calibration using the pressure gauge as the standard device, as illustrated in FIG. 2, it is necessary to use a more accurate pressure gauge than the calibrated device. Alternatively, the calibration needs to be performed by the same calibration procedure as when the pressure gauge serving as the standard device is calibrated. Accordingly, there are limitations on the calibration procedure.

In the general step-wise calibration procedure illustrated in FIGS. 3 and 4, the hysteresis difference can be seen in the calibration result due to the history effect, and the calibration result is affected by measurement conditions such as the maximum pressure of the calibration. For this reason, when the pressure gauge calibrated in the step-wise calibration procedure is used as the standard device, it is necessary to use the same calibration procedure as when the pressure gauge is calibrated by the superior standard device. Alternatively, it is necessary to consider the influence affected by a difference in the procedures.

If the procedure is used which necessarily restores the pressure zero state after the data is acquired at each calibration pressure point illustrated in FIGS. 5 and 6, the hysteresis difference is decreased, and the maximum pressure of the calibration has a reduced impact on the calibration result. The information with regard to the hysteresis difference of the calibrated device cannot be obtained by the general step-wise calibration.

The present invention aims to realize a calibration apparatus that uses a lightweight and easy-to-manage pressure gauge as a standard device and that accurately performs calibration even on a calibrated device having a performance comparable to a standard device, in various calibration procedures including a general step-wise calibration procedure.

Solution for Solving Problems

In order to solve the above-described problems, there is provided a pressure gauge calibration apparatus calibrating a pressure gauge that is a calibrated device, by a pressure gauge serving as a standard device, the pressure gauge calibration apparatus including:
a pressure pipe along which a shut-off valve is arranged;
a pressure generation control device; and
a measurement control unit,
wherein the measurement control unit controls the shut-off valve and the pressure generation control device such that calibration is performed by repeating shutting off pressure transmission between the pressure gauge serving as the standard device and the calibrated device, performing pressurization in a separate procedure, and obtaining calibration data while the pressure gauge serving as the standard device and the calibrated device are in the pressure transmission state at a calibration pressure point.

In addition, according to the present invention, in the above-described pressure gauge calibration apparatus, the measurement control unit controls the shut-off valve and the pressure generation control device such that the pressure gauge serving as the standard device is restored to be in a predetermined pressure state after acquiring the calibration data at the calibration pressure point.

In addition, according to the present invention, in the above-described pressure gauge calibration apparatus, the measurement control unit controls the shut-off valve and the pressure generation control device such that the pressure gauge serving as the standard device is restored to be in a pressure zero state after acquiring the calibration data at the calibration pressure point.

In addition, according to the present invention, in the above-described pressure gauge calibration apparatus, preceding calibration of the pressure gauge serving as the standard device is performed by a superior standard device with a calibration procedure to repeat restoring a predetermined pressure state after the measurement at the calibration pressure point.

In addition, according to the present invention, in the above-described pressure gauge calibration apparatus, an order of the calibration pressure poi nt is set to be any desired order including a step-wise order and a random order.

In addition, according to the present invention, in the above-described pressure gauge calibration apparatus, the measurement control unit has an external connection interface, and a dedicated program to which parameters required for the calibration can be set in advance is installed such that the calibrated device can be automatically calibrated.

Effect of the Invention

According to the pressure gauge calibration apparatus of the present invention, the following advantageous effects can be achieved.

(1) The pressure gauge can be very accurately calibrated by the calibration procedure tailored to a client's request, without using a dead weight pressure balance, which is tedious to manage, as the standard device. In addition, it is possible to accurately evaluate a time-dependent change characteristic or a hysteresis characteristic of the calibrated device.

(2) By performing the calibration in the same procedure as the calibration procedure when the calibrated device is actually used in a jobsite, reliability on pressure measurement in the jobsite is improved.

(3) By the dedicated program to which parameters required for the calibration can be set in advance, the pressure gauge calibration apparatus can fully automatically perform the calibration in an unattended environment.

BRIEF DESCRIPTION OF THE DRAWINGS

FIG. 7(a) illustrates a calibration procedure of the present invention in which pressure adjustment is performed on a calibrated device by using the step-wise procedure and is performed on a pressure gauge serving as a standard device by using the 0-A-0 type procedure. FIG. 7(b) illustrates a calibration process in the related art in which pressure adjustment is performed on both of them by using the same step-wise procedure.

FIG. 9(a) illustrates a calibration procedure in which calibration pressure points are changed in a random order. FIG. 9(b) illustrates a calibration procedure in which a pressure is continuously applied at one calibration pressure point for a long time.

DESCRIPTION OF EMBODIMENTS

A calibration procedure in a calibration apparatus of the present invention will be described with reference to FIGS. 7, 8, and 9.

Figure 7:
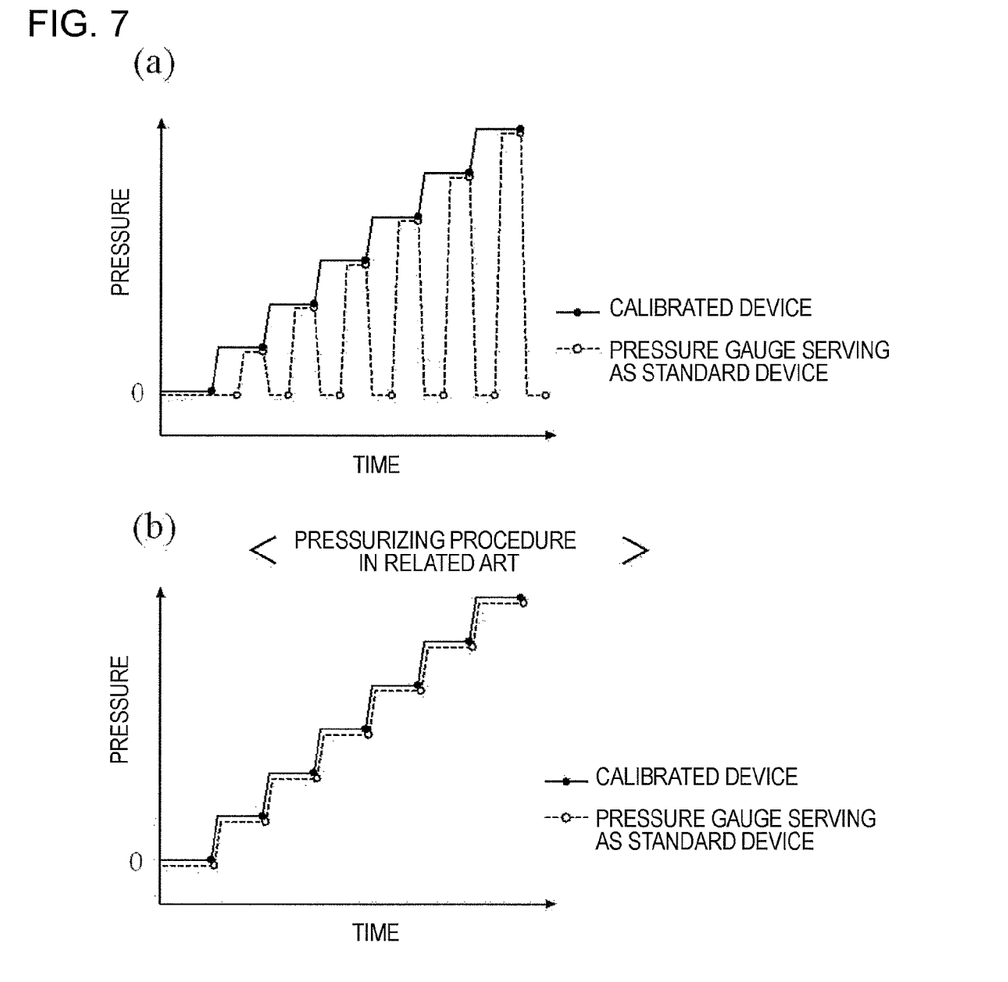
FIG. 7 is a conceptual diagram for illustrating a step-wise calibration procedure of the present invention.
Figure 8:
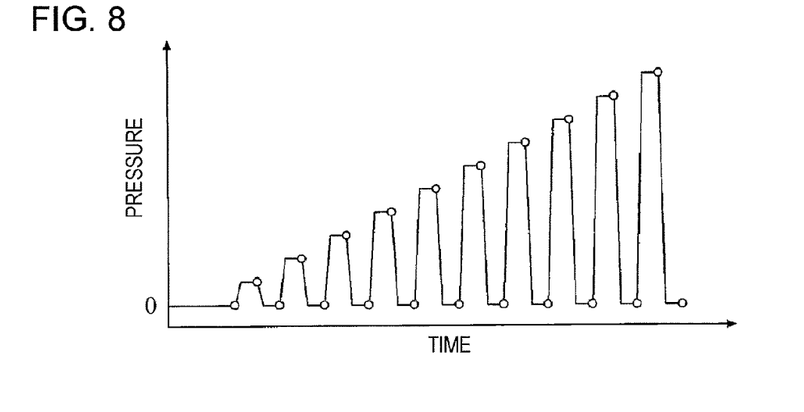
FIG. 8 illustrates an example of a calibration procedure when a pressure gauge serving as a standard device of the present invention is calibrated in advance.

FIG. 7 illustrates a time change in a pressure received by a pressure gauge serving as a standard device and a calibrated device when the calibrated device is calibrated in a step-wise calibration procedure. The pressure received by the calibrated device is illustrated by a solid line and the pressure received by the pressure gauge serving as the standard device is illustrated by a dotted line. Time for acquiring measurement data and the pressure in a case of the calibrated device are illustrated by a black circle, and those in a case of the pressure gauge serving as the standard device are illustrated by a white circle.

FIG. 7 illustrates a procedure when step-wise calibration is performed on the calibrated device by using the present invention. FIG. 7 (a) illustrates a case of using the present invention. Whereas the calibrated device is subjected to pressure adjustment by using the step-wise calibration, the pressure gauge serving as the standard device is subjected to the pressure adjustment by using the 0-A-0 type procedure. When data is acquired at each calibration pressure point, the same pressure is applied to the pressure gauge serving as the standard device and the calibrated device. FIG. 7(b) illustrates a case of using the related art (see FIG. 2). During the calibration, the same pressure is constantly applied to the pressure gauge serving as the standard device and the calibrated device.

When performing the calibration by using the present invention, the pressure gauge serving as the standard device is calibrated in advance with the 0-A-0 type procedure. FIG. 8 illustrates an example of the procedure when calibrating the pressure gauge serving as the standard device in advance. Outputs at each calibration pressure point and a pressure zero state (for example, in a case of a gauge pressure, an atmospheric pressure release state or a standard atmospheric pressure state may be acceptable) are measured, and calibration values are calculated. FIG. 8 illustrates a case where the calibration pressure points are increased in order. If the measurement in the pressure zero state is necessarily performed between the measurements at the calibration pressure points, the order of the calibration pressure points can be changed.

As illustrated in FIGS. 5 and 6, in the 0-A-0 type calibration procedure, influence of a pressure history is suppressed to be smaller. As a result, a hysteresis difference of the output is decreased and calibration conditions such as the maximum pressure are hardly affected. For this reason, in the present invention, even when the order of the calibration pressure points is changed, the output from the pressure gauge serving as the standard device is stable, thereby enabling a very accurate calibration.

If the calibration apparatus is used, it is possible to set the order of the calibration pressure points not only step-wise but also arbitrarily. In addition, it is also possible to change pressure holding time at each calibration pressure point and in the pressure zero state.

Figure 9:
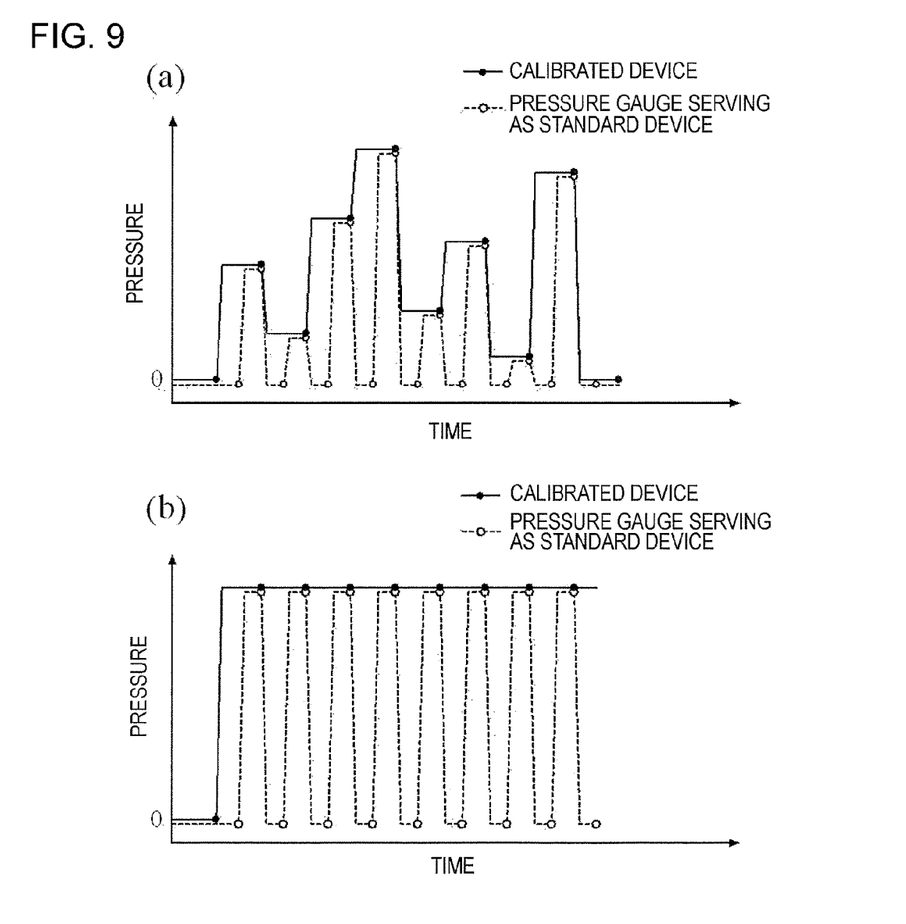
FIG. 9 illustrates an application example of a calibration procedure of the present invention.

FIG. 9 illustrates an application example of the calibration procedure of the present invention. FIG. 9(a) illustrates a case of changing the calibration pressure points of the calibrated device in random order. FIG. 9(b) illustrates a case where a time-dependent change in the calibrated device is measured while continuously applying a constant pressure to the calibrated device. At each calibration pressure point, outputs from the pressure gauge serving as the standard device and the calibrated device, to both of which the same pressure is applied, are compared with each other. The pressure gauge serving as the standard device is subjected to the pressure adjustment in the 0-A-0 type procedure. Accordingly, the outputs are hardly affected by the order of the calibration pressure points, and it is possible to accurately perform the calibration as in a case of step-wise procedure illustrated in FIG. 7(a).

In the above description, the pressure gauge serving as the standard device is restored to the pressure zero state (for example, in a case of a gauge pressure, the atmospheric pressure release state or the standard atmospheric pressure state may be acceptable). However, a state other than the pressure zero state, for example, a predetermined pressure state such as a pressure state close to pressure zero or a pressure state close to the maximum applied pressure, may be adopted.

EXAMPLE

Example 1

Figure 10:
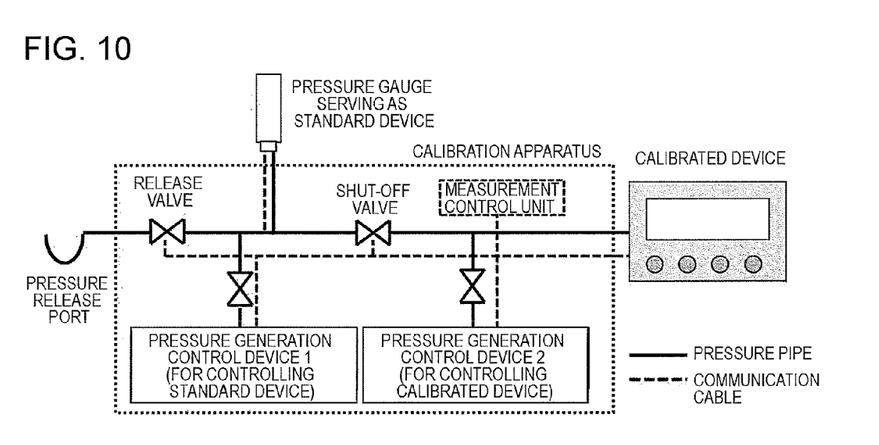
FIG. 10 illustrates a first example (Example 1) of a calibration apparatus of the present invention.
Figure 11:
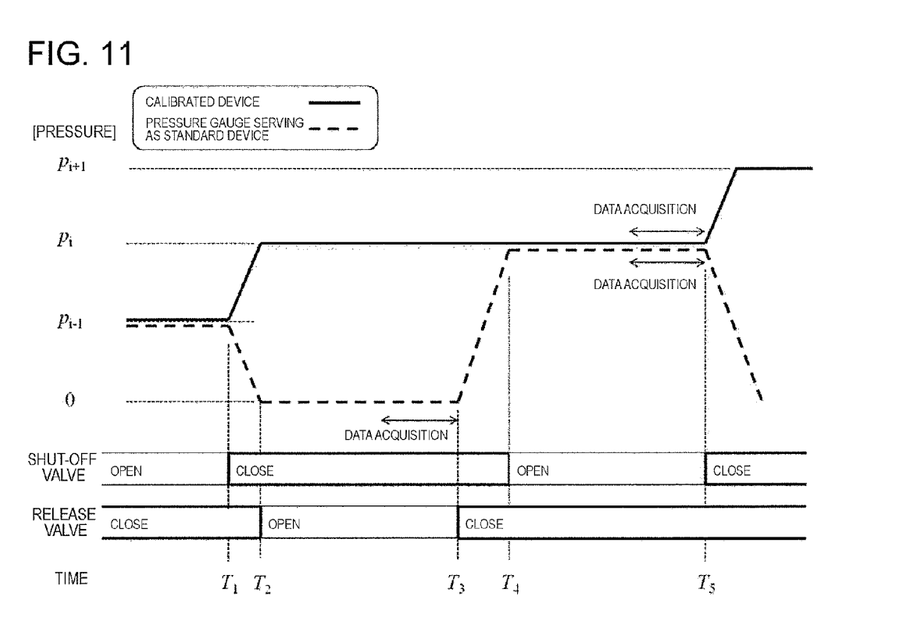
FIG. 11 illustrates a calibration procedure in the first example, and operations of a shut-off valve and a release valve.

FIG. 10 illustrates a first example of a calibration apparatus of the present invention. FIG. 11 illustrates a calibration procedure and an operation of a shut-off valve in the calibration apparatus in FIG. 10. In the first example, the shut-off valve is arranged along a pressure pipe that connects the pressure gauge serving as the standard device and the calibrated device. A pressure generation control device is connected to each of the pressure gauge side serving as the standard device and the calibrated device side, across the shut-off valve. A release valve is connected to the pressure gauge side serving as the standard device, and is extended to a pressure release port for allowing the pressure zero state.

The pressure gauge serving as the standard device, the shut-off valve, the release valve and the pressure generation control device, which are illustrated in FIG. 10, can be controlled by a measurement control unit. All operations can be automatically performed by inputting required parameters. The pressure gauge serving as the standard device may be internally installed in the calibration apparatus, or may be externally connected to the calibration apparatus by using a pipe.

FIG. 11 illustrates the calibration procedure of the pressure gauge serving as the standard device and the calibrated device, and operations of the shut-off valve and the release valve in order to realize the calibration procedure illustrated in FIG. 7 (a) by using the apparatus of Example 1.

Pressure transmission is shut off between the pressure gauge serving as the standard device and the calibrated device by closing the shut-off valve at a calibration pressure point $p_{i-1}$ at time $T_1$ when data acquisition is completed. A pressure generation control device 1 is used to lower the pressure of the pressure gauge serving as the standard device to be zero. A pressure generation control device 2 is used to adjust the pressure of the calibrated device to the subsequent calibration pressure point $p_i$.

After the calibrated device reaches the pressure $p_i$, the pressure is held to be constant until the data is acquired.

The pressure gauge serving as the standard device is caused to be in the pressure zero state by opening the release valve (time $T_2$), and after the waiting time, the output in the pressure zero state is measured (time $T_3$).

After the measurement, the release valve is closed and the pressure gauge serving as the standard device is subjected to the pressure adjustment to reach the subsequent calibration pressure point $p_i$ by using the pressure generation control device 1. When reaching $p_i$, the shut-off valve is opened, and the pressure transmission between the pressure gauge serving as the standard device and the calibrated device is allowed (time $T_4$). After the waiting time, the output of the pressure gauge serving as the standard device and the calibrated device is measured at $p_i$.

Also when the pressure is adjusted to the subsequent calibration pressure point, the same procedure is repeated (a state of time $T_5$ in FIG. 11 corresponds to a state of time $T_1$ in a case where the pressure is adjusted to the subsequent calibration pressure point).

Figure 12:
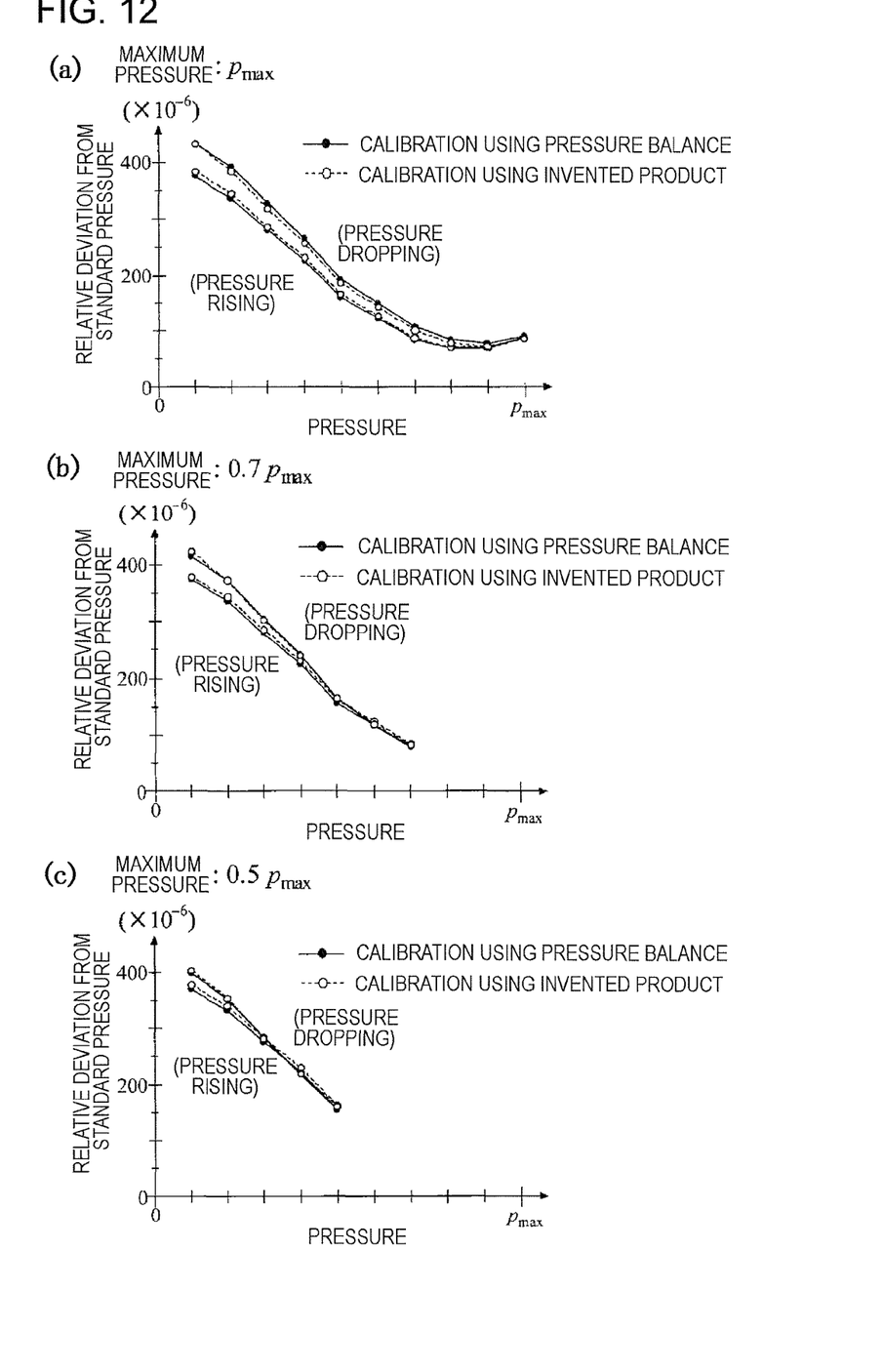
FIG. 12 is a view for comparing calibration results obtained by using the calibration apparatus of the first example and calibration results obtained by using a dead weight pressure balance.

FIG. 12 illustrates comparison between the calibration result using the calibration apparatus illustrated in FIG. 10 and the operation procedure illustrated in FIG. 11 and the calibration result using the dead weight pressure balance.

The calibration results by using the calibration apparatus in which the dead weight pressure balance illustrated in FIG. 1 serves as the standard device in the step-wise calibration procedure are illustrated by the black circle and the solid line. The calibration results performed by using an invented product are illustrated by the white circle and the dotted line. The calibration results in a case where the maximum pressure is changed into three types are illustrated in FIGS. 12(a), 12(b), and 12(c). The pressure gauge serving as the standard device is calibrated with the 0-A-0 type calibration procedure of 100 MPa in maximum pressure, and the same calibration value is used in all of three cases. In every case, the calibration results using the invented product excellently coincide with the calibration results using the deadweight pressure balance as the standard device.

In this manner, it is found out that the invented product can be used to evaluate the influence affected by the maximum pressure of the calibration when the calibrated device is calibrated with the step-wise procedure, in the same way that the dead weight pressure balance is used.

An aspect of Example 1 is summarized as follows.

A pressure gauge calibration apparatus including:

a pressure gauge serving as a standard device, the pressure gauge being calibrated in advance by a calibration procedure to repeat necessarily restoring a pressure zero state after data acquisition at each calibration pressure point, and adjusting pressure to a subsequent calibration pressure point;

a pressure pipe along which a shut-off valve is arranged; and a measurement control unit, wherein one end of the pressure pipe is connected to a pressure gauge that is a calibrated device, and the other end thereof is extended to a pressure release port through a release valve, wherein the pressure gauge serving as the standard device and a pressure generation control device 1 are connected between, in the pressure pipe, the shut-off valve and the release valve, wherein a pressure generation control device 2 is connected between, in the pressure pipe, the shut-off valve and the calibrated device, wherein the measurement control unit performs control to repeat:

acquiring data at a calibration pressure point when the shut-off valve is opened, the release valve is closed, and the pressure gauge serving as the standard device and the calibrated device are in the pressure transmission state therebetween;

after the data is acquired, closing the shut-off valve, lowering by the pressure generation control device 1 the pressure of the pressure gauge serving as the standard device to zero, opening the release valve, and adjusting by the pressure generation control device 2 the pressure of the calibrated device nearly to a subsequent calibration pressure point;

next, closing the release valve, and adjusting by the pressure generation control device 1 the pressure of the pressure gauge serving as the standard device to the subsequent calibration pressure point; and if the subsequent calibration pressure point is reached, opening the shut-off valve, making the pressure gauge serving as the standard device and the calibrated device in the pressure transmission state, and acquiring the data at the subsequent calibration pressure point.

Example 2

Figure 13:
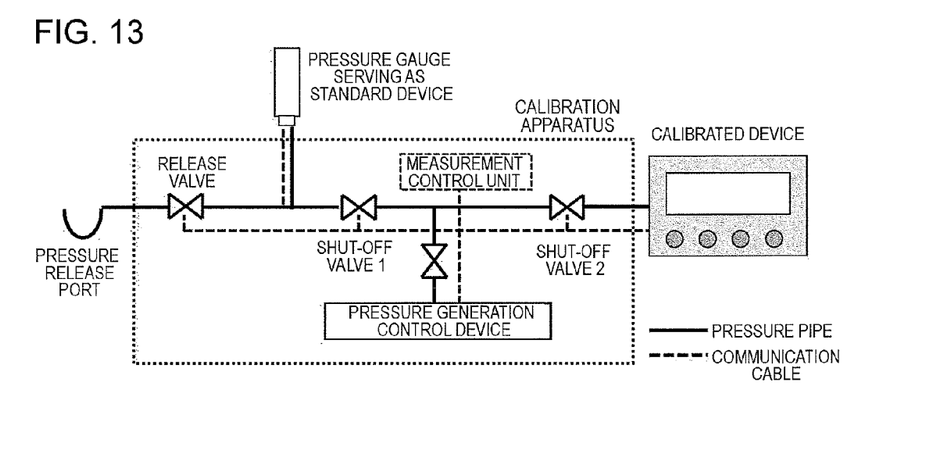
FIG. 13 illustrates a second example (Example 2) of a calibration apparatus of the present invention.
Figure 14:
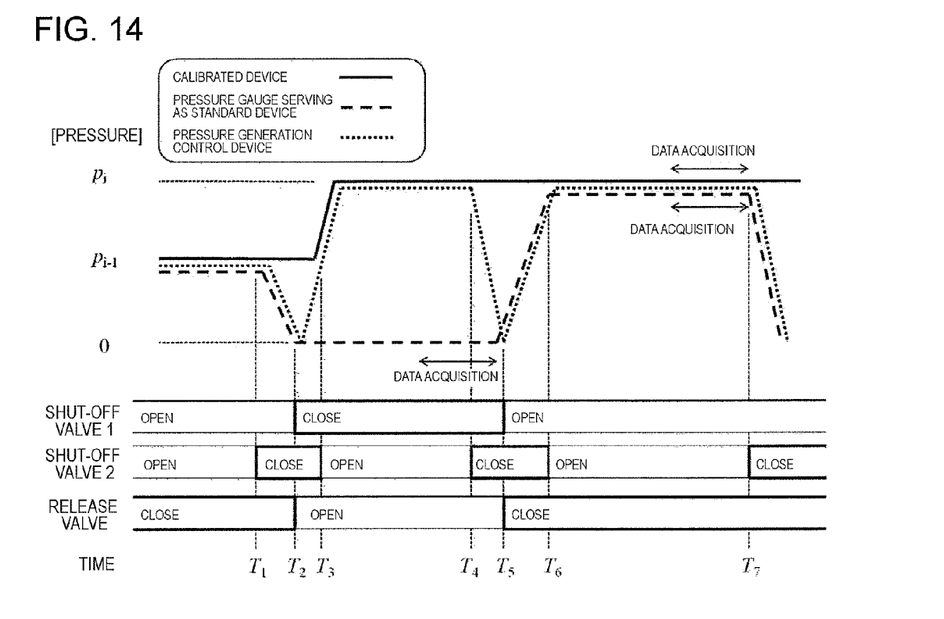
FIG. 14 illustrates a calibration procedure in the second example, and operations of shut-off valves 1 and 2 and a release valve.

FIG. 13 illustrates a second example of a calibration apparatus of the present invention. FIG. 14 illustrates a calibration procedure and an operation of shut-off valves in the calibration apparatus in FIG. 13. In the second example, two shut-off valves are connected along the pressure pipe that connects the pressure gauge serving as the standard device and the calibrated device. One pressure generation control device is connected to a pipe between the two shut-off valves. A release valve is connected to the pressure gauge side serving as the standard device, and is extended to a pressure release port for allowing the pressure zero state. The pressure gauge serving as the standard device may be internally installed in the calibration apparatus, or may be externally connected to the calibration apparatus by using a pipe.

The pressure gauge serving as the standard device, the shut-off valves and the pressure generation control device, which are illustrated in FIG. 13, are controlled and enabled to acquire the data by the measurement control unit. Thus, it is possible to automatically perform all the operations by inputting required parameters.

FIG. 14 illustrates a calibration procedure of the pressure gauge serving as the standard device and the calibrated device, and operations of the shut-off valves 1 and 2 and the release valve in order to realize the calibration procedure illustrated in FIG. 7(a) by using the apparatus of Example 2.

Let $T_1$ be the time when data measurement is completed at the calibration pressure point $p_{i-1}$. When the data is acquired, the shut-off valves 1 and 2 are in the opened state. However, at time $T_1$, the shut-off valve 2 is closed, and the pressure of the pressure gauge serving as the standard device is lowered to be zero by using the pressure generation control device.

The release valve is opened, the pressure gauge serving as the standard device is caused to be in the pressure zero state, and then the shut-off valve 1 is closed. The pressure transmission between the pressure gauge serving as the standard device and the pressure generation control device is shut off (time $T_2$). After the waiting time, the output from the pressure gauge serving as the standard device in the pressure zero state is measured.

In the meanwhile, the pressure is adjusted to the pressure $p_{i-1}$ by the pressure generation control device. When the pressure is equal to the pressure $p_{i-1}$ of the calibrated device, the shut-off valve 2 is opened (time $T_3$). Thereafter, the pressure of the calibrated device is adjusted to the subsequent calibration pressure point $p_i$, and the pressure is maintained to be constant.

Punctually to the time when the measurement of the pressure gauge serving as the standard device is completed in the pressure zero state, the shut-off valve 2 is re-closed at time $T_4$, and the pressure of the pressure generation control device is lowered to be zero while maintaining the pressure of the calibrated device to be $p_i$.

After the measurement of the pressure gauge serving as the standard device is completed in the pressure zero state, the release valve is closed (time $T_5$). The shut-off valve 1 is opened, the pressure transmission is allowed between the pressure generation control device and the pressure gauge serving as the standard device, and the pressure is adjusted to the subsequent measurement pressure $p_i$. When the pressure $p_i$ is reached, the shut-off valve 2 is opened and the pressure transmission is allowed among the pressure gauge serving as the standard device, the pressure generation control device and the calibrated device (time $T_6$). After the waiting time, outputs from the pressure gauge serving as the standard device and the calibrated device are measured at the pressure $p_i$.

Also when the pressure is adjusted to the subsequent calibration pressure point, the same procedure is repeated (the state of time $T_7$ in FIG. 14 corresponds to the state of time $T_1$ in a case where the pressure is adjusted to the subsequent calibration pressure point).

An aspect of Example 2 is summarized as follows.

A pressure gauge calibration apparatus including:

a pressure gauge serving as a standard device, the pressure gauge being calibrated in advance by a calibration procedure to repeat necessarily restoring a pressure zero state after data acquisition at each calibration pressure point, and adjusting pressure to a subsequent calibration pressure point;

a pressure pipe along which a shut-off valve 1 and a shut-off valve 2 are arranged; and a measurement control unit, wherein one end of the pressure pipe is connected to a pressure gauge that is a calibrated device, and the other end thereof is extended to a pressure release port through a release valve, wherein the shut-off valve 1 is arranged nearer the release valve relative to the shut-off valve 2, wherein the pressure gauge serving as the standard device is connected between, in the pressure pipe, the shut-off valve 1 and the release valve, wherein a pressure generation control device is connected between, in the pressure pipe, the shut-off valve 1 and the shut-off valve 2, wherein the measurement control unit performs control to repeat:

acquiring data at a calibration pressure point when the shut-off valve 1 and the shut-off valve 2 are opened, the release valve is closed, and the pressure gauge serving as the standard device and the calibrated device are in the pressure transmission state therebetween;

after the data is acquired, closing the shut-off valve 2, lowering by the pressure generation control device the pressure of the pressure gauge serving as the standard device to zero, opening the release valve, then closing the shut-off valve 1, and shutting off the pressure transmission between the pressure gauge serving as the standard device and the pressure generation control device;

next, adjusting the pressure by the pressure generation control device, and when the immediately preceding calibration pressure point is reached, opening the shut-off valve 2, and adjusting the pressure nearly to a subsequent calibration pressure point;

next, after the shut-off valve 2 is closed, lowering the pressure of the pressure generation control device to zero;

next, closing the release valve, opening the shut-off valve 1, making the pressure generation control device and the pressure gauge serving as the standard device in the pressure transmission state, and adjusting the pressure to the subsequent calibration pressure point;

if the subsequent calibration pressure point is reached, opening the shut-off valve 2, making the pressure gauge serving as the standard device and the calibrated device in the pressure transmission state, and acquiring a data at the subsequent calibration pressure point.

INDUSTRIAL APPLICABILITY

In the above-described examples, as a predetermined pressure state, the description has been made such that the pressure gauge serving as the standard device is restored to the pressure zero state (for example, in a case of a gauge pressure, the atmospheric pressure release state or the standard atmospheric pressure state may be acceptable). However, a state other than the pressure zero state, for example, such as a pressure state close to pressure zero or a pressure state close to the maximum applied pressure may be adopted.

The invention claimed is:

1. A pressure gauge calibration apparatus calibrating a pressure gauge device, by a pressure gauge serving as a standard device, the pressure gauge calibration apparatus comprising:

a pressure pipe along which a shut-off valve is arranged;

a pressure generation control device; and a measurement control unit, wherein the measurement control unit controls the shut-off valve and the pressure generation control device such that calibration is performed by repeating a series of the steps of:

closing the shut-off valve so as to shut off pressure transmission between the pressure gauge serving as the standard device and the device to be calibrated, adjusting pressure to the pressure gauge serving as the standard device or the device to be calibrated by the pressure generation control device, and opening the shut-off valve so as to keep pressure transmission between the pressure gauge serving as the standard device and the device to be calibrated and acquiring calibration data at a calibration pressure point by the measurement control unit.

2. The pressure gauge calibration apparatus according to claim 1, wherein the measurement control unit controls the shut-off valve and the pressure generation control device such that the pressure gauge serving as the standard device is restored to be in a predetermined pressure state after acquiring the calibration data at the calibration pressure point.

3. The pressure gauge calibration apparatus according to claim 2,
wherein the measurement control unit controls the shut-off valve and the pressure generation control device such that the pressure gauge serving as the standard device is restored to be in a pressure zero state after acquiring the calibration data at the calibration pressure point.

4. The pressure gauge calibration apparatus according to claim 2,
wherein calibration of the pressure gauge serving as the standard device is performed by a superior standard device with a calibration procedure to repeat restoring a predetermined pressure state after the measurement at the calibration pressure point.

5. The pressure gauge calibration apparatus according to claim 2,
wherein an order of the calibration pressure points is set to be any desired order including a step-wise order and a random order.

6. The pressure gauge calibration apparatus according to claim 1,
wherein the measurement control unit has a dedicated program and an external connection interface, through which a parameter required for the calibration can be inputted in advance into the dedicated program, such that the device to be calibrated can be automatically calibrated.

* * * * *

UNITED STATES PATENT AND TRADEMARK OFFICE
CERTIFICATE OF CORRECTION

PATENT NO. : 9,476,790 B2
APPLICATION NO. : 14/345738
DATED : October 25, 2016
INVENTOR(S) : Hiroaki Kajikawa et al.

It is certified that error appears in the above-identified patent and that said Letters Patent is hereby corrected as shown below:

In the Drawings

Replace the five (5) sheets of drawings containing Figures 1-6 with the attached Replacement Sheets of drawings containing Figures 1-6 labeled as "PRIOR ART".

Signed and Sealed this
Twenty-sixth Day of December, 2017

PRIOR ART
FIG. 1
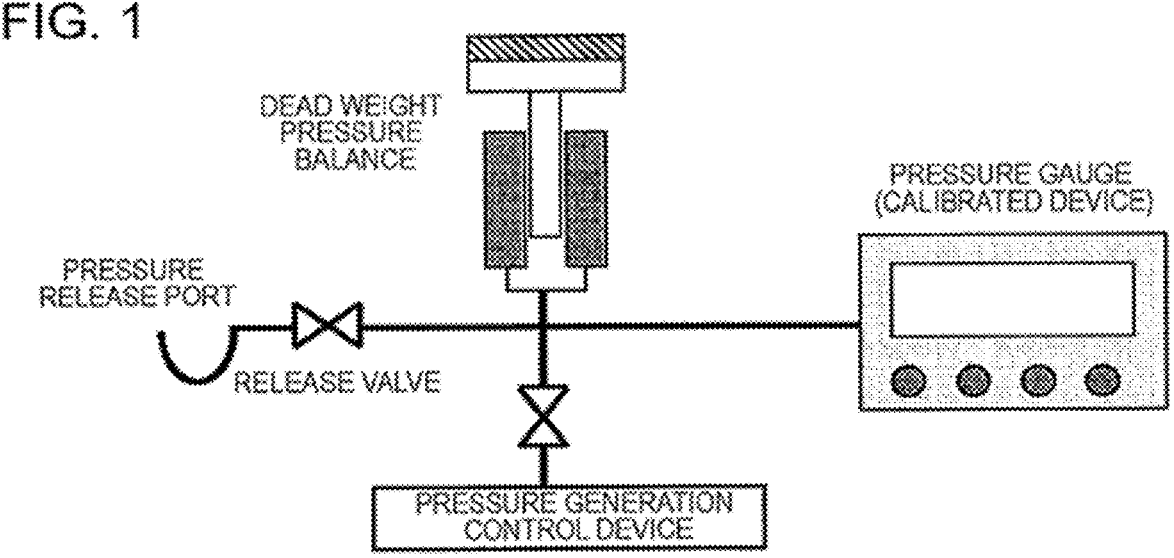
FIG. 2
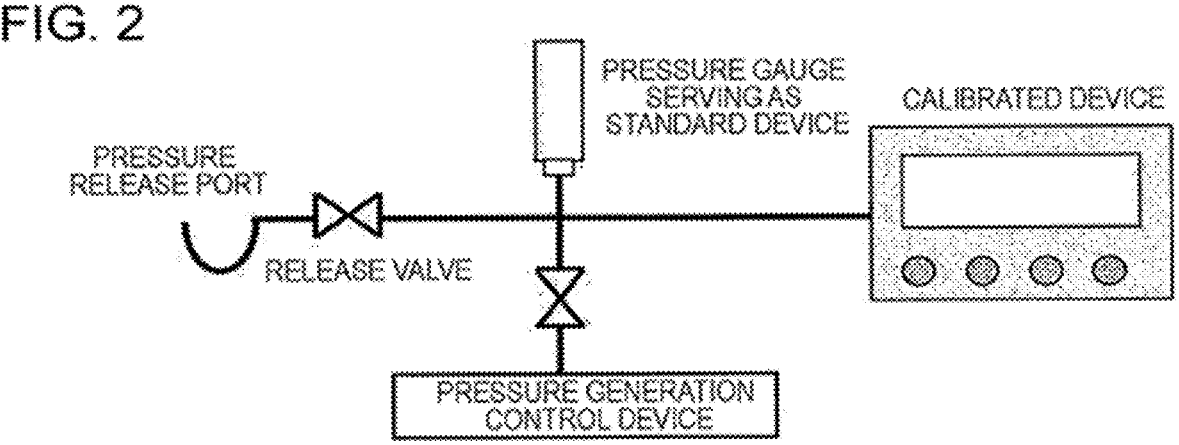

PRIOR ART
FIG. 3
(a)
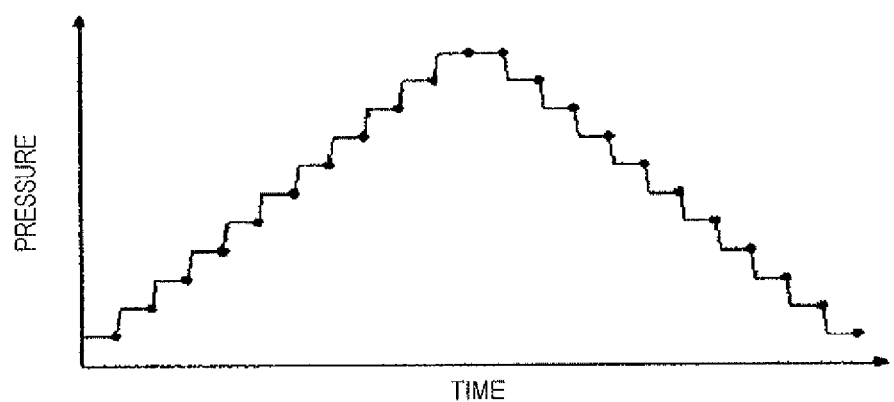
(b)
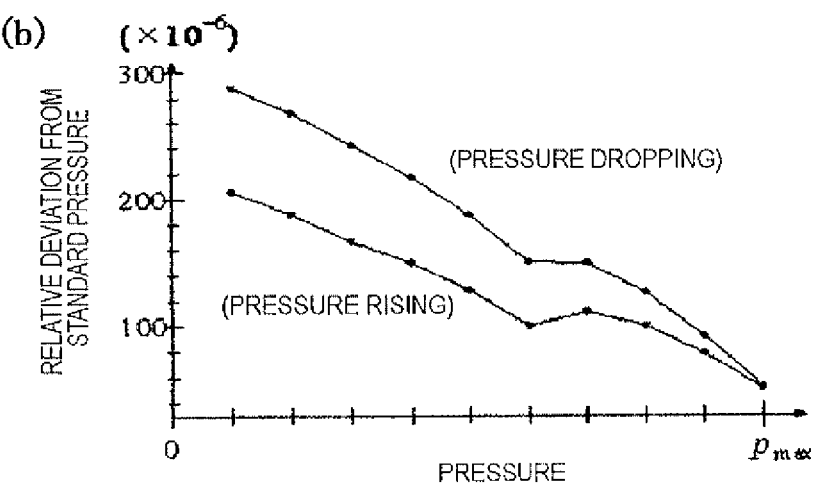

PRIOR ART
FIG. 4
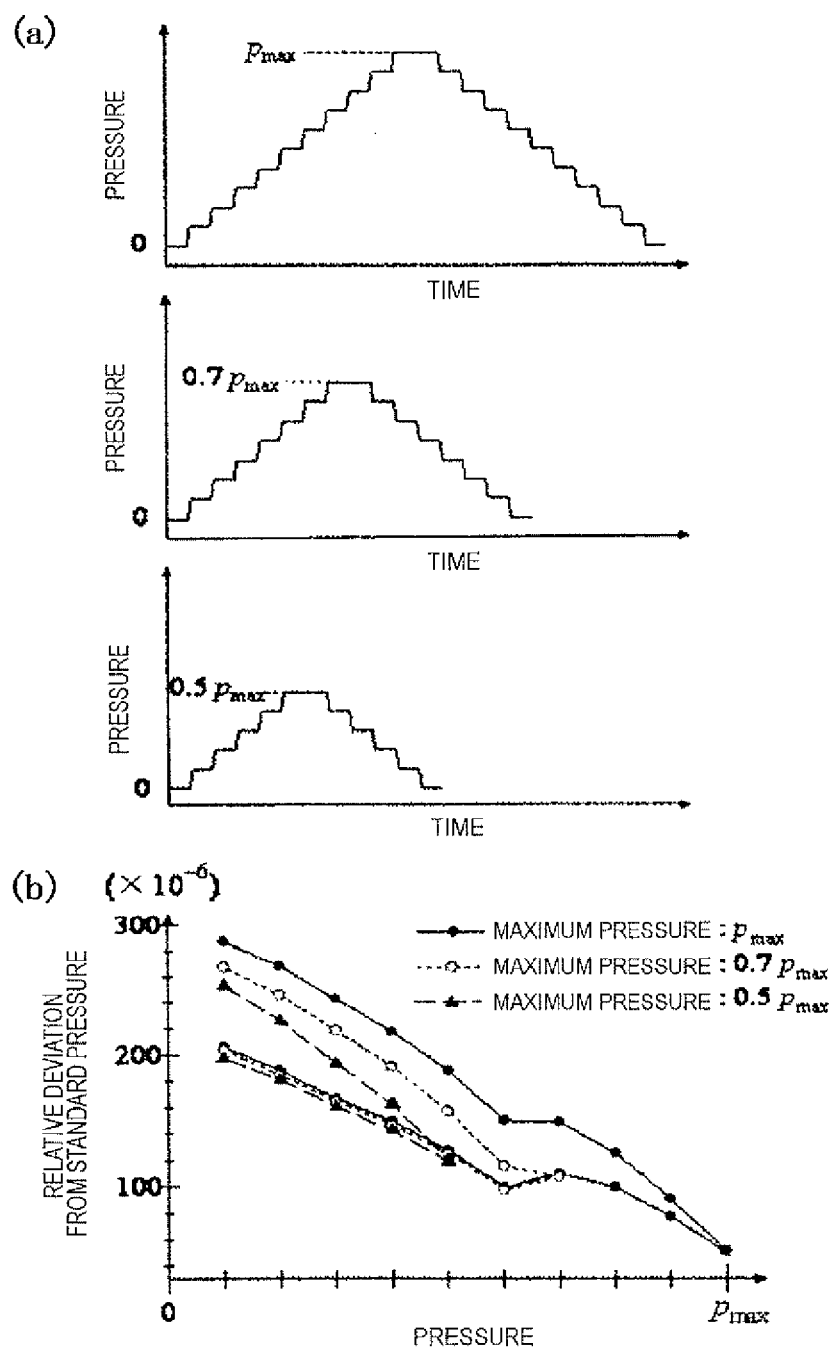

PRIOR ART
FIG. 5
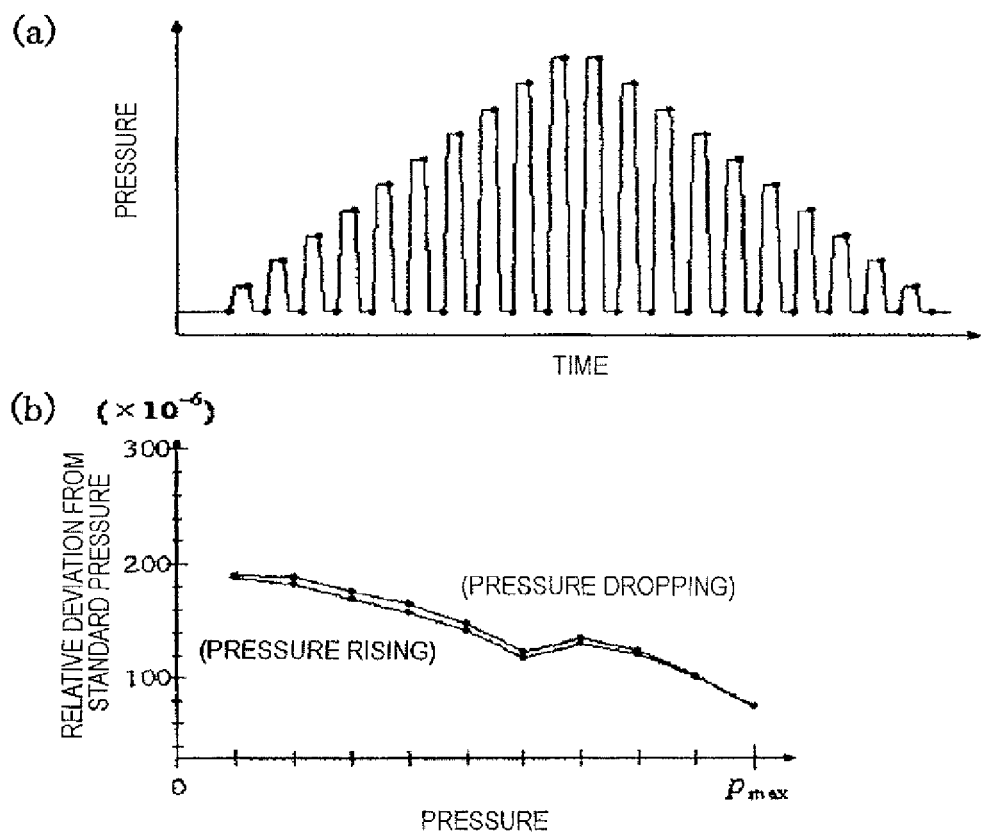

PRIOR ART
FIG. 6
(a)
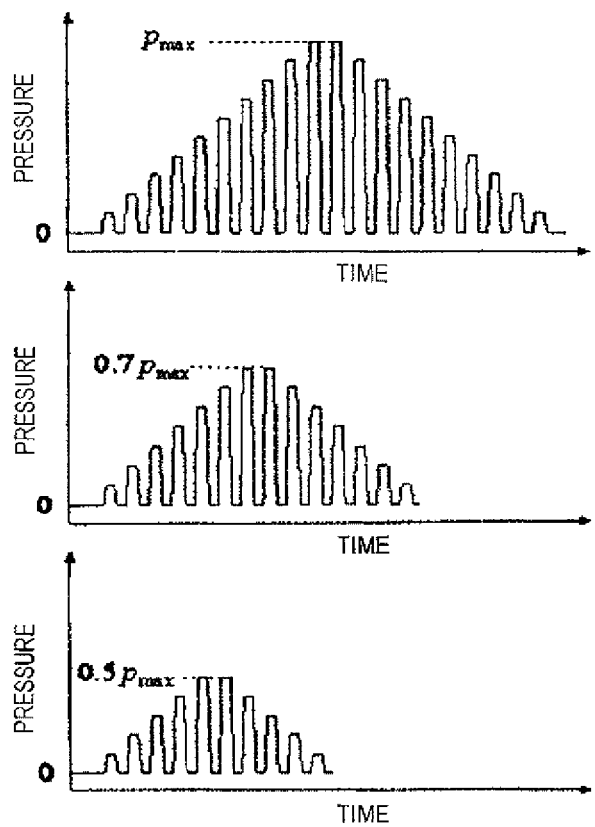
(b)
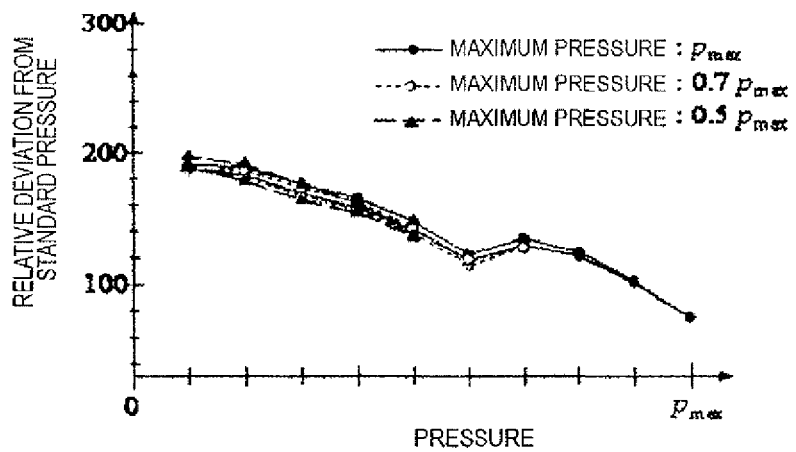

Joseph Matal
*Performing the Functions and Duties of the
Under Secretary of Commerce for Intellectual Property and
Director of the United States Patent and Trademark Office*